(12) United States Patent
Mosdzien et al.

(10) Patent No.: US 12,372,009 B2
(45) Date of Patent: Jul. 29, 2025

(54) OIL-COOLED EXHAUST TURBINE APPARATUS

(71) Applicant: ACCELLERON SWITZERLAND LTD., Baden (CH)

(72) Inventors: Moritz Mosdzien, Baden (CH); Andreas Schmid, Gutach (DE); Stefan Gantert, Lottstetten (DE); Wolfgang Joos, Amtzell (DE); Davide Marra, Niederrohrdorf (CH)

(73) Assignee: ACCELLERON SWITZERLAND LTD., Baden (CH)

( * ) Notice: Subject to any disclaimer, the term of this patent is extended or adjusted under 35 U.S.C. 154(b) by 0 days.

(21) Appl. No.: 18/685,120

(22) PCT Filed: Sep. 13, 2022

(86) PCT No.: PCT/EP2022/075421
§ 371 (c)(1),
(2) Date: Feb. 20, 2024

(87) PCT Pub. No.: WO2023/037008
PCT Pub. Date: Mar. 16, 2023

(65) Prior Publication Data
US 2024/0352873 A1   Oct. 24, 2024

(30) Foreign Application Priority Data

Sep. 13, 2021 (EP) ..................................... 21196319
Nov. 26, 2021 (EP) ..................................... 21210804

(51) Int. Cl.
*F01D 25/12* (2006.01)
(52) U.S. Cl.
CPC ........ *F01D 25/125* (2013.01); *F05D 2220/40* (2013.01); *F05D 2240/50* (2013.01); *F05D 2260/232* (2013.01)

(58) Field of Classification Search
CPC .............. F01D 25/125; F05D 2220/40; F05D 2240/50; F05D 2260/232
See application file for complete search history.

(56) References Cited

U.S. PATENT DOCUMENTS

| 4,364,717 A | 12/1982 | Schippers et al. |
| 11,377,979 B2 | 7/2022 | Ikeya |
| 2014/0219777 A1 | 8/2014 | Uneura et al. |

FOREIGN PATENT DOCUMENTS

| DE | 2945272 A1 | 5/1980 | |
| GB | 2039632 A * | 8/1980 | ............. F01D 25/12 |

(Continued)

OTHER PUBLICATIONS

Translation JP-2022502598-A (Year: 2025).*
(Continued)

*Primary Examiner* — J. Todd Newton
(74) *Attorney, Agent, or Firm* — Meunier Carlin & Curfman LLC

(57) ABSTRACT

According to embodiments described herein, an oil-cooled exhaust turbine apparatus is provided. The exhaust turbine apparatus comprises a rotatable shaft with a turbine wheel, a bearing member comprising a bearing, a bearing housing comprising a sealing bush portion for providing a first sealing device axially between the turbine wheel and the bearing member; an oil cooling chamber for cooling an inner face of the bearing housing, an oil channel for providing oil into the oil cooling chamber, an oil drainage chamber arranged axially between the bearing member and the sealing bush portion and an oil barrier wall surrounding, in at least a vertically top circumferential segment, a radially outer side of the oil drainage chamber for covering the oil drainage chamber from the oil cooling chamber.

19 Claims, 5 Drawing Sheets

(56) References Cited

FOREIGN PATENT DOCUMENTS

| | | | | |
|---|---|---|---|---|
| JP | H0565829 | A | * | 3/1993 |
| JP | 2008208732 | A | | 9/2008 |
| JP | 5983147 | B2 | | 8/2016 |
| JP | 2022502598 | A | * | 1/2022 |
| WO | WO-2012147161 | A1 | * | 11/2012 ............. F01D 25/24 |
| WO | 2019159744 | A1 | | 8/2019 |

OTHER PUBLICATIONS

Translation JP_H0565829_A (Year: 2025).*
Translation WO-2012147161-A1 (Year: 2025).*
International Search Report and Written Opinion in Application No. PCT/EP2022/075421, mailed Jan. 12, 2023, 15 pages.
Search Report in European Application No. 21196319.4, dated Mar. 7, 2022, 10 pages.

* cited by examiner

OIL-COOLED EXHAUST TURBINE APPARATUS

FIELD OF INVENTION

Embodiments of the present disclosure relate to exhaust turbine apparatuses such as turbochargers, more particularly to oil-cooled exhaust turbine apparatuses. In further detail, embodiments of the present disclosure relate to oil-cooled exhaust turbine apparatuses having a radial bearing and sealing devices.

BACKGROUND

Exhaust turbine apparatuses such as exhaust gas turbochargers are known to be used for increasing the power of an internal combustion engine. In such an exhaust gas turbocharger, a turbine is provided in the exhaust gas path of the internal combustion engine, and a compressor is arranged upstream of the internal combustion engine, which is connected to the turbine via a common shaft. The shaft is typically supported by a shaft bearing supported in a bearing housing. Thus, an exhaust gas turbocharger is generally constituted by a rotor, a bearing assembly for the shaft, flow-guiding housing sections (compressor housing and turbine housing) and a bearing housing. The rotor includes a shaft, an impeller and a turbine wheel.

An exhaust turbine apparatus allows converting the energy which is stored within the exhaust gas of an internal combustion engine into rotational energy. In the case of a turbocharger using this rotational energy for charging the internal combustion engine, the capacity and therefore the fuel mixture in the cylinders are increased, and a noticeable power increase for the engine is hereby gained. In the case of a power turbine, the rotational energy can be converted into electrical or mechanical energy. In this case, instead of a compressor, as in the case of the exhaust gas turbocharger, for example a generator or a mechanical consumer is connected to the turbine shaft.

The shaft bearing of the exhaust turbine apparatus is typically lubricated by a lubricating oil.

Because of the high process pressure in the turbine-side and in the compressor-side flow region, the shaft of the exhaust gas turbocharger is sealed with a suitable sealing concept in relation to the bearing housing. The internal pressure in the bearing housing usually corresponds to the atmospheric pressure. The gas pressure in the flow passage of the compressor side and turbine side depends, however, upon the current operating point of the exhaust gas turbocharger and at most operating points lies above the pressure in the cavity of the bearing housing. In certain cases, however, a negative pressure is also to be taken into consideration, for example, in partial load operation or at rest.

The lubricating oil supplied to shaft bearings of charging systems typically needs to be sealed by a shaft seal to avoid oil leakage into the gas paths of the components. In oil cooled charging systems, however, the oil load within the charging system can unduly increase due to the different pressure conditions such that oil leakage can occur more easily, e.g. at the shaft seal. Especially in oil cooled systems, where the lubricating oil can also be used to cool the bearing housing, a high oil load can lead to increased oil leakage.

Therefore, there is a demand for charging systems with improved sealing performance to prevent oil leakage.

SUMMARY

In light of the above, an oil-cooled exhaust turbine apparatus is provided. The exhaust turbine apparatus comprises a rotatable shaft with a turbine wheel, a bearing member comprising a bearing for rotatably supporting the shaft, a bearing housing accommodating the bearing member therein and comprising a sealing bush portion extending radially inwardly towards the shaft at an axial position between the turbine wheel and the bearing member for providing a first sealing device axially between the turbine wheel and the bearing member; and an oil cooling chamber for cooling an inner face of the bearing housing. The exhaust turbine apparatus further comprises an oil channel for providing oil into the oil cooling chamber for cooling the inner wall of the bearing housing using the oil as cooling medium; and an oil drainage chamber arranged axially between the bearing member and the sealing bush portion. The exhaust turbine apparatus further comprises an oil barrier wall surrounding, in at least a vertically top circumferential segment, a radially outer side of the oil drainage chamber for covering the oil drainage chamber from the oil cooling chamber.

Embodiments are also directed at methods for operating the described apparatus. It includes method aspects for carrying out every function of the apparatus.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Figure 1:
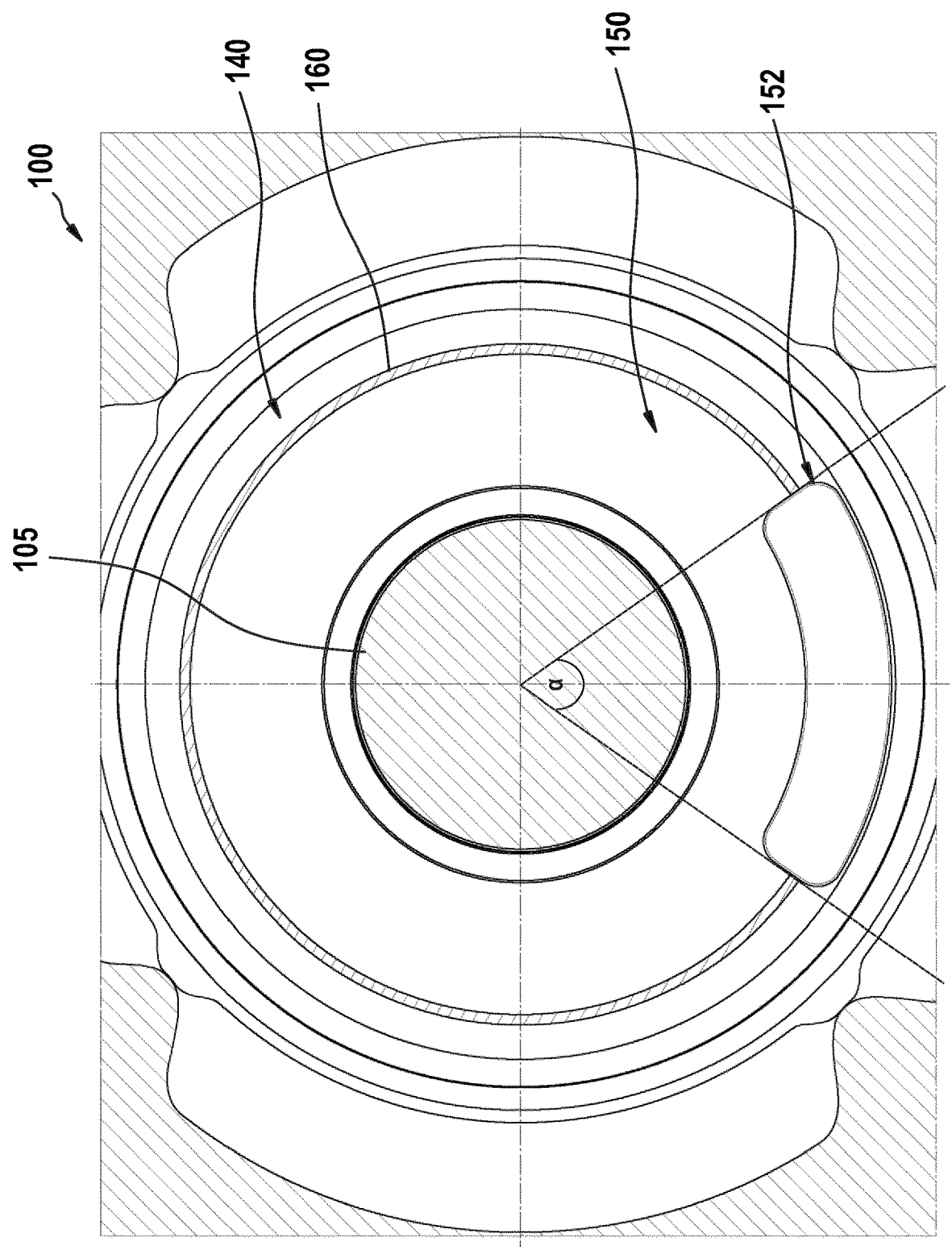
FIG. 1 shows a cross-sectional front view of an exhaust turbine apparatus according to embodiments described herein.

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

Within the following description of the drawings, the same reference numbers refer to the same or similar components. Generally, only the differences with respect to the individual embodiments are described. Unless specified otherwise, the description of a part or aspect in one applies to a corresponding part or aspect in another embodiment as well.

According to embodiments that can be combined with any other embodiment described herein, an oil-cooled exhaust turbine apparatus is provided. The exhaust turbine apparatus may be a turbocharger or a power turbine. The exhaust turbine apparatus includes a rotatable shaft with a turbine wheel. The turbine may be a radial turbine (with a substantial radial flow component at a upstream side of the turbine wheel, which also includes mixed-flow or diagonal turbines). The shaft may rotate around a rotation axis, particularly a horizontal rotation axis. The shaft may connect a turbine wheel and a compressor wheel (or another load such as a generator) at opposing axial sides of the shaft.

According to embodiments, the turbine apparatus includes a bearing member including a bearing for rotatably supporting the shaft. The shaft may rotate within the bearing. The bearing can be a plain (sliding) bearing or a rolling bearing. The bearing can be (include) a radial bearing and/or an axial bearing. The bearing may include a bearing bush to allow for rotation of the shaft within the bearing. The bearing member may include a bearing flange for mounting the bearing member within a bearing housing.

According to embodiments that can be combined with any other embodiment described herein, the turbine apparatus may include a bearing housing. The bearing housing can be configured to house or accommodate the bearing member. The bearing member may be separate from the bearing housing and removably insertable into a central cavity of the bearing housing. The bearing member can be mounted to the bearing housing via the bearing flange. The bearing housing can at least partially radially surround the bearing member including the bearing.

According to embodiments, the bearing housing can axially extend towards the turbine wheel. The bearing housing can provide a barrier between the bearing member and the turbine wheel, i.e. the bearing housing can delimit the bearing member towards the turbine wheel. Particularly, the bearing housing can axially delimit the bearing member.

According to embodiments, the bearing housing includes a scaling bush portion extending radially inwardly towards the shaft at an axial position between the turbine wheel and the bearing member. The sealing bush portion may be a turbine-facing wall of the bearing housing. For example, the sealing bush portion may be integrally formed with the bearing housing. Alternatively, the sealing bush portion may be a separate component of the bearing housing. Additionally or alternatively, the sealing bush portion and the bearing member may be separate components with respect to each other, i.e. the sealing bush portion and the bearing member may be formed non-integrally with respect to each other. Further, the bearing member may be a separate component of the bearing housing. Accordingly, the scaling bush portion and the bearing member both may be separate components from the bearing housing, i.e. the sealing bush portion and the bearing member both may be formed non-integrally with the bearing housing. Additionally or alternatively, the scaling bush portion may be separate (non-integrally) from the bearing housing while the bearing member may be formed integrally with the bearing housing. Alternatively, the sealing bush portion may be formed integrally with the bearing housing and the bearing member may be separate (non-integrally) from the bearing housing.

According to embodiments that can be combined with any other embodiment described herein, the exhaust turbine apparatus may include an oil supply system. The oil supply system may provide oil, in particular lubricating oil, to the bearing member, particularly to the bearing, for lubricating the bearing. The oil supply system may be configured to provide oil, particularly cooling oil, to an oil channel and therethrough to an oil cooling chamber. Accordingly, the oil supply system may be configured to provide oil to the bearing member and to the oil cooling chamber for cooling the bearing housing, in particular for cooling the turbine-facing wall of the bearing housing.

According to embodiments that can be combined with any other embodiment described herein, the turbine apparatus, in particular the bearing housing, may include an oil cooling chamber for cooling an inner face of the bearing housing. The inner face of the bearing housing may include an inner side of the sealing bush portion, i.e. a side of the sealing bush portion facing the bearing member. Additionally or alternatively, the inner face of the bearing housing may be an inner side of a turbine-facing wall of the bearing housing. The oil cooling chamber may be a space between the bearing member and the bearing housing and/or the sealing bush portion. In other words, the oil cooling chamber may be provided by the bearing housing and the bearing member. Further, the oil cooling chamber may be at least partly delimited by the shaft and/or the bearing.

According to embodiments, the oil cooling chamber may at least partly surround the shaft. The oil cooling chamber may (at least partly) enclose the shaft, particularly the oil cooling chamber may be arranged at a vertical top region of the shaft. The oil cooling chamber may be axially delimited by the bearing housing and the bearing member. Further, the sealing bush portion may delimit the oil cooling chamber at least partially from radially inwards and axially from the turbine wheel.

According to embodiments, the oil cooling chamber may be provided with oil for cooling the inner face of the oil cooling chamber. The oil cooling chamber may receive oil, particularly lubricating oil, from the oil channel. The oil channel may be arranged within the turbine apparatus. In other words, the exhaust turbine apparatus may include the oil channel. Particularly, the bearing member, e.g. the bearing flange, may include the oil channel. The oil channel may be bore in a wall of the turbine apparatus. The oil channel may be directed towards the inner face of the bearing housing and/or the oil cooling chamber to spray oil towards the inner face of the bearing housing and/or the oil cooling chamber. The oil channel may be a bore and/or a nozzle for spraying the oil towards the inner face of the oil cooling chamber for cooling the inner face and thus, for cooling the bearing housing. Cooling may occur by the cooling oil running down the inner face of the bearing housing.

According to embodiments, the oil cooling chamber may include an oil recess for receiving oil from the oil cooling chamber. The oil recess may be arranged at the bearing member and/or the scaling bush portion. For example, the oil recess may be integrally formed with one of the bearing member and/or the sealing bush portion. The inner face of the oil cooling chamber may extend radially inwards to the oil recess for guiding the oil from the inner face to the oil recess. The oil recess may form a drainage channel. The drainage channel may extend at least partially circumferentially for guiding the cooling oil downwards along drainage channel around the rotatable shaft. The drainage channel may be configured for guiding the cooling oil towards the oil drainage. The oil recess and/or the drainage channel may be arranged at a radial inwardly position compared to a position of the oil channel.

According to embodiments, the exhaust turbine apparatus may include an oil drainage. The oil drainage may be arranged vertically below the shaft. The oil drainage may be configured to receive oil from the oil cooling chamber. The oil drainage may further be configured to provide the received oil back to the oil supply system. Thus, the oil can be reused for lubricating and/or cooling.

According to embodiments that can be combined with any other embodiment described herein, the sealing bush portion is configured to provide a first scaling device axially between the turbine wheel and the bearing member. The sealing device can be provided radially between the sealing bush portion and the shaft. Particularly, the shaft may rotate and the scaling device may be stationary arranged with the sealing bush portion. The first sealing device may prevent (lubricating or cooling) oil from the bearing side (e.g., from the bearing and/or from the drainage chamber) to enter towards the turbine wheel, i.e. towards a gas passage of the exhaust turbine apparatus. Additionally, the first sealing device may prevent hot gas from the turbine wheel to enter towards the bearing side. Herein, the term "prevent" means that the first scaling device has a substantial scaling effect with respect to the oil and/or hot gas, so that for example a pressure drop is substantially sustained by the sealing device (so that the bearing side may be essentially kept at atmospheric pressure even under overpressure at the turbine side). On the other hand, the term "prevent" does not exclude for example small residual amounts of oil and/or hot gas ("blowby") passing through the first sealing device.

According to embodiments, the first scaling device may include a plurality of sealing elements to prevent oil from reaching the turbine wheel. The sealing elements may include one or more oil catch chambers, piston rings, scaling rings, scaling gaps, labyrinth seals, seal air and/or combinations thereof. Advantageously, a plurality of sealing elements within the first sealing device results in a decreased oil load that can reach the turbine wheel.

According to embodiments that can be combined with any other embodiment described herein, the first sealing device may be or include one sealing element, e.g. a piston ring. Additionally or alternatively, the first sealing device may be or include two (or more) sealing elements. Particularly, the two sealing elements may be an oil catch chamber and a piston ring. Axially in the direction towards the turbine, the oil catch chamber and the piston ring may be arranged in a row, i.e. that the piston ring may be provided axially closer at a turbine side compared to the oil catch chamber. Additionally, the first scaling device may include a further piston ring, for example by having two piston rings adjacent to each other. Thus, the scaling device may have a total number of two sealing elements (e.g., one piston ring and one oil catch chamber) or three sealing elements (e.g., two piston rings and one oil catch chamber). By selecting a total number of two or three sealing elements for the sealing device in this manner, the first sealing device may be appropriately dimensioned for providing a good balance between (axially) spatial requirements and sealing function.

According to embodiments that can be combined with any other embodiment described herein, the shaft may provide a cavity for supporting the piston ring, e.g. to clamp the piston ring between the shaft and the (stationary) sealing bush portion. Further, the piston ring may be axially pressed against the cavity of the shaft when the oil-cooled exhaust turbine apparatus is in operation. The cavity may have a first wall and a second wall on axially opposing sides. The first wall may be arranged on the bearing side of the cavity and the second wall may be arranged on the turbine side of the cavity. The piston ring may thus, axially be pressed against the first wall of the cavity. The first wall may further include a bearing-sided recess. Radially outwardly of the recess, the scaling bush portion may include a radial depression adjacent to, i.e. bearing-sided with respect to, the piston ring. Additionally or alternatively, the piston ring may be provided at the depression, i.e. the depression may extend in an axial direction, to provide the piston ring at the shaft, particularly to support that the piston ring may be pressed against the shaft during operation.

According to embodiments, the cavity may provide a space at a turbine-facing side of the piston ring to allow for axially pressing the piston ring towards the first wall of the cavity. The space may be provided between the second wall of the cavity and the piston ring. The second wall may be tapered. Thus, less exhaust gas, i.e. so called "blowby", may pass the first scaling device, i.e. the scaling elements.

According to embodiments, the scaling bush portion may include a notch. The notch may extend towards the turbine side of the scaling bush portion. Accordingly, a higher pressure may act on the piston ring, thus improving pressing of the piston ring against the first wall of the cavity. Accordingly, gas tightness of the first scaling device can be increased and improved. The notch may further reduce blowby from passing the first scaling device or the scaling element(s) of the first scaling device.

According to embodiments that can be combined with any other embodiment described herein, the exhaust turbine apparatus includes an oil drainage chamber arranged axially between the bearing member and the scaling bush portion. The oil drainage chamber may be a space axially formed between the bearing member and the sealing bush portion. Accordingly, an axial extension of the oil drainage chamber may be dependent from a distance between the bearing member and the sealing bush portion.

According to embodiments, the oil drainage chamber may extend radially outwardly from the shaft and/or from the bearing, e.g. the bearing bush of the bearing member. Accordingly, on a radial bottom side, the oil drainage chamber may be delimited by the shaft, the scaling bush portion and/or by the bearing. For example, the bearing may intrude into the oil drainage chamber and thus, delimit the oil drainage chamber at a radial inner side. At a vertical top side, the oil drainage chamber may be delimited by an oil barrier wall. Particularly, the oil drainage chamber may be at least formed by a turbine-facing side wall of the bearing member and a bearing-member-facing side wall of the sealing bush portion and optionally by the shaft.

According to embodiments, the oil drainage chamber may at least partly surround the shaft. The oil drainage chamber may be open vertically below the shaft for allowing oil to exit the oil drainage chamber. For example, the oil drainage chamber may receive oil from the bearing and may guide the oil towards the oil drainage arranged vertically below the shaft. In other words, the oil drainage chamber may have an oil drainage opening at a vertically bottom side of the oil drainage chamber vertically below the shaft. In particular, the opening may define a circumferential opening angle α ranging from more than 0° to at least 180°. The opening angle may open towards a vertical downwards direction.

According to embodiments that can be combined with any other embodiment described herein, the exhaust turbine apparatus includes an oil barrier wall surrounding, in at least a vertically top circumferential segment, a radially outer side of the oil drainage chamber for covering the oil drainage chamber from the oil cooling chamber. Accordingly, the oil barrier wall may be configured to delimit the oil drainage chamber. The oil barrier wall may be configured to avoid or prevent oil from entering the oil drainage chamber. From a radial view, i.e. from a front view, the oil barrier wall may at least partially surround the shaft at a top side of the shaft.

The term "covered" as used throughout this disclosure may be understood in that no direct straight path between the oil cooling chamber and the oil drainage chamber may be present. The oil cooling chamber and the oil drainage chamber may be in fluid connection but may not be connected by a direct straight path in between.

According to embodiments, the opening of the oil drainage chamber may be defined by the oil barrier wall being absent at a vertically bottom circumferential segment. The vertically bottom circumferential segment may be opposite the vertically top circumferential segment. Accordingly, the oil barrier wall may be seen as a (partial) semicircle arranged around the rotation axis of the shaft, particularly as a (partial) semicircle arranged at a vertical top side of the shaft.

According to embodiments, the oil barrier wall may be arranged radially inwardly of the oil channel. In particular, the bearing member may include the oil channel and the oil barrier wall may be arranged radially inwardly of the oil channel.

According to embodiments, the oil barrier wall may be configured to prevent oil from entering from the oil cooling chamber in the oil drainage chamber. Thus, the oil load in the drainage chamber may be decreased which decreases an amount of oil at the first scaling device. Therefore, oil leakage at the first scaling device can be prevented, avoided and/or reduced.

According to embodiments, a second sealing device may provided between the oil barrier wall and the bearing member and/or between the oil barrier wall and the sealing bush portion. The second sealing device may be selected from the group consisting of a sealing gap, a sealing ring, a labyrinth seal, a contact seal, seal air and/or combinations thereof. The second scaling device may have an extension in a radial or in an axial direction. For example, when the oil barrier wall overlaps with one of the bearing member and the sealing bush portion, the second sealing device may be arranged radially between the oil barrier wall and one of the bearing member and the sealing bush portion. In another example, when the oil barrier wall is flush with one of the bearing member and the scaling bush portion, the second scaling device may be arranged axially between the oil barrier wall and one of the bearing member and the sealing bush portion.

According to embodiments, the oil barrier wall may be formed integrally with one of the sealing bush portion and the bearing member (and may be formed separately, i.e., non-integrally, with the other one of the scaling bush portion and the bearing member). For example, the oil barrier wall may be an axial extension of one of the sealing bush portion and the bearing member, i.e. an extension parallel to the direction of the rotation axis of the shaft. The oil barrier wall may include an axial wall section extending axially from a wall base at the one of the scaling bush portion and the bearing member.

According to embodiments, the oil barrier wall may further include a wall tip section axially overlapping with the other one of the sealing bush portion and the bearing member. Particularly, the wall tip section may be opposite to the respective wall base. Alternatively, the wall tip section may be flush with the other one of the sealing bush portion and the bearing member. Additionally, the oil barrier wall may include a radial wall section extending radially outwardly from the wall portion, in particular at the wall tip section. The radial wall section may be flush or may axially overlap with the other one of the sealing bush portion and the bearing member. Accordingly, a flow of oil from the oil cooling wall can be prevented even more effectively.

According to embodiments, the oil barrier wall may be connected to the oil recess. For example, when the oil barrier wall is integrally formed with one of the bearing member and the sealing bush portion, the oil recess may be formed at a transition of the oil barrier wall and one of the bearing member and the sealing bush portion. Accordingly, the drainage channel can be configured to guide oil received from the oil cooling chamber and/or the oil barrier wall to the oil drainage.

Advantageously, the oil-cooled exhaust turbine apparatus as provided herein beneficially prevents direct entrance of cooling oil and/or secondary oil, i.e. swirled or reflected oil from the bearing or shaft, to enter the oil drainage chamber, i.e. the cavity between the bearing member and the first sealing device while still ensuring proper cooling of the turbine-sided bearing housing due to ensuring cooling oil drainage. Accordingly, oil tightness is improved and oil leakage can be prevented and/or avoided. Beneficially, the oil load at the first sealing device is reduced and the sealing performance at the first sealing device is enhanced.

FIG. 1 exemplarily shows a cross-sectional front view of an exhaust turbine apparatus 100 according to embodiments described herein, with the viewing direction along an axis of the turbine. The cross-sectional plane of FIG. 1 is indicated as A-A in FIG. 2, described below. The exhaust turbine apparatus 100 includes a rotatable shaft 105, and an oil cooling chamber 140. The exhaust turbine apparatus 100 may further include a bearing, particularly a plain bearing. An oil barrier wall 160 is provided between the oil cooling chamber 140 and the shaft and defines an oil drainage chamber 150. The oil drainage chamber includes an oil drainage opening. The opening the opening defines the circumferential opening angle α. The oil barrier wall at least partly surrounds the shaft and further defines an oil drainage opening 152 being arranged at a vertical bottom side of the shaft 105. The oil barrier wall 160 may prevent cooling oil from the oil cooling chamber to reach the shaft, thereby reducing the amount of cooling oil reaching the shaft from the oil cooling chamber.

Figure 2:
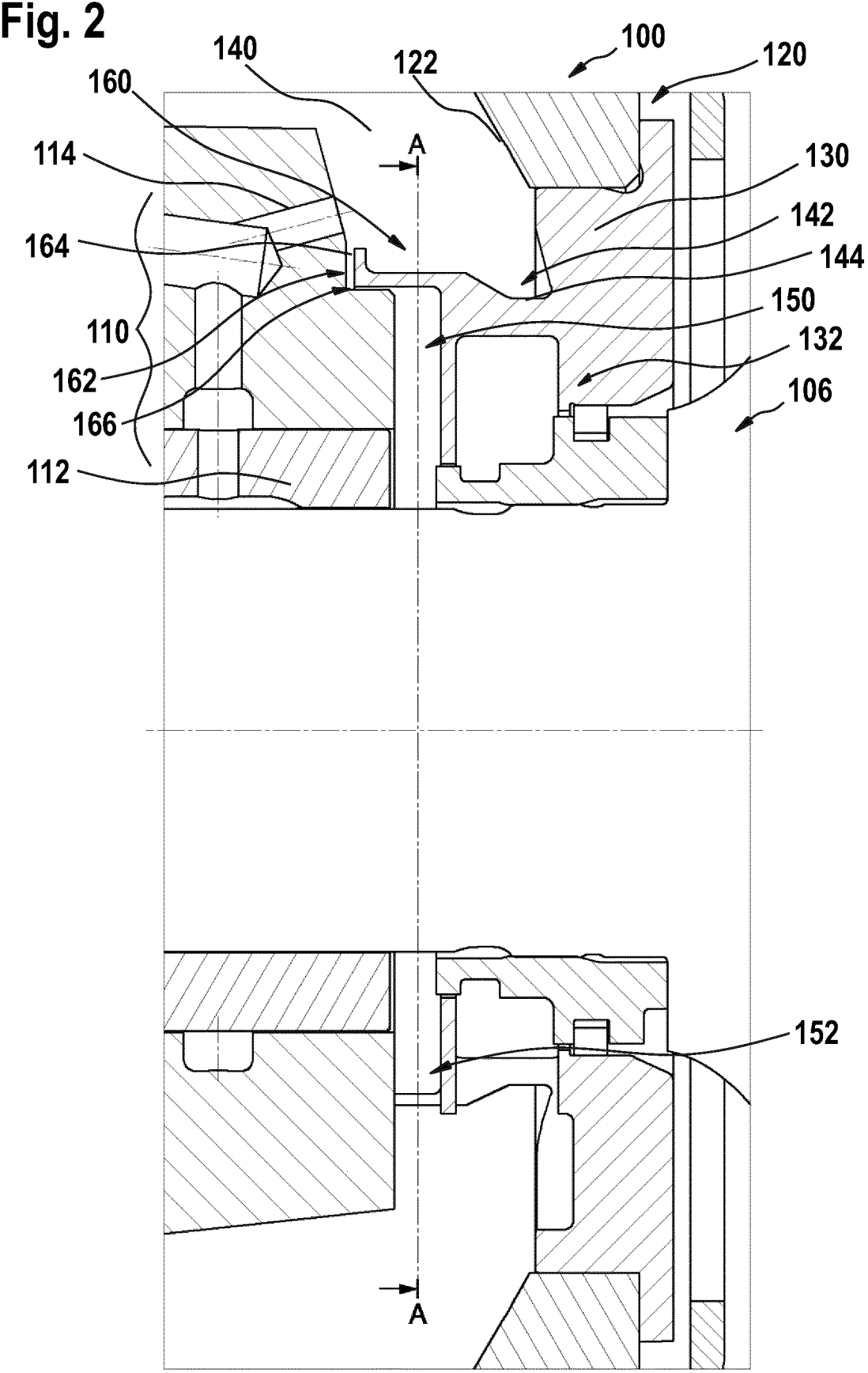
FIG. 2 shows a cross-sectional side view of an exhaust turbine apparatus according to embodiments described herein.

FIG. 2 exemplarily shows a cross-sectional side view of an exhaust turbine apparatus 100 according to embodiments described herein. FIG. 2 shows a portion of the bearing housing 120 and the bearing member 110. The exhaust turbine apparatus 100 includes a bearing housing 120 and a bearing member 110 including a bearing 112, in which a shaft connected to the turbine wheel 106 is mounted. The shaft is in connection with a turbine wheel 106 and can rotate within the bearing 112. The bearing member 110 may be provided as a module which is removable, as a whole, from the bearing housing 120.

The exhaust turbine apparatus 100 further includes an oil channel 114 for providing cooling oil to the oil cooling chamber 140, i.e. to the inner face 122 of the oil cooling chamber 140 for cooling a turbine-side wall of the bearing housing 120. The cooling oil may be obtained from an oil lubrication system of the bearing member 110. Axially between the bearing member 110 and a sealing bush portion 130, the oil drainage chamber 150 is provided. The oil drainage chamber 150 is delimited by the oil barrier wall 160 at a radial outer portion, particularly at a vertical top portion of the shaft 105.

In the embodiment shown in FIG. 2, the oil barrier wall 160 is integrally formed with the scaling bush portion 130 and overlaps with the bearing member 110. The oil barrier wall includes a wall tip portion 162 and a radial wall portion 164 extending radially outwardly. Between the oil barrier wall and the bearing member, a second sealing device 166, e.g. a sealing gap, is provided. Radially between the scaling bush portion 130 and the shaft 105, a first sealing device 132 is arranged. In the embodiment of FIG. 2, the first sealing device includes an oil catch chamber and a piston ring for providing a sealing towards the turbine wheel 106 (axially between the oil drainage chamber 150 and the turbine wheel 106), i.e. towards a gas passage in fluid connection with the turbine wheel 106.

The oil cooling chamber includes an oil recess 142 and a drainage channel 144 to guide cooling oil from the oil cooling chamber 140 circumferentially around the shaft 105. Vertically below the shaft, the oil drainage chamber 150 includes an oil drainage opening 152 for allowing oil that may have reached the oil drainage chamber to exit the oil drainage chamber.

It is to be understood that, according to embodiments, the first sealing device may include more than one oil catch chambers, e.g. two to five oil catch chambers, particularly two to three oil catch chambers, even more particularly one to two oil catch chambers. For example, one or more additional webs radially provided by the scaling bush portion in a direction towards the shaft and adjacent to an oil catch chamber may form additional oil catch chambers. When more than one oil catch chamber is present, the respective oil catch chambers may be provided axially in a row, particularly next to each other.

Figure 3:
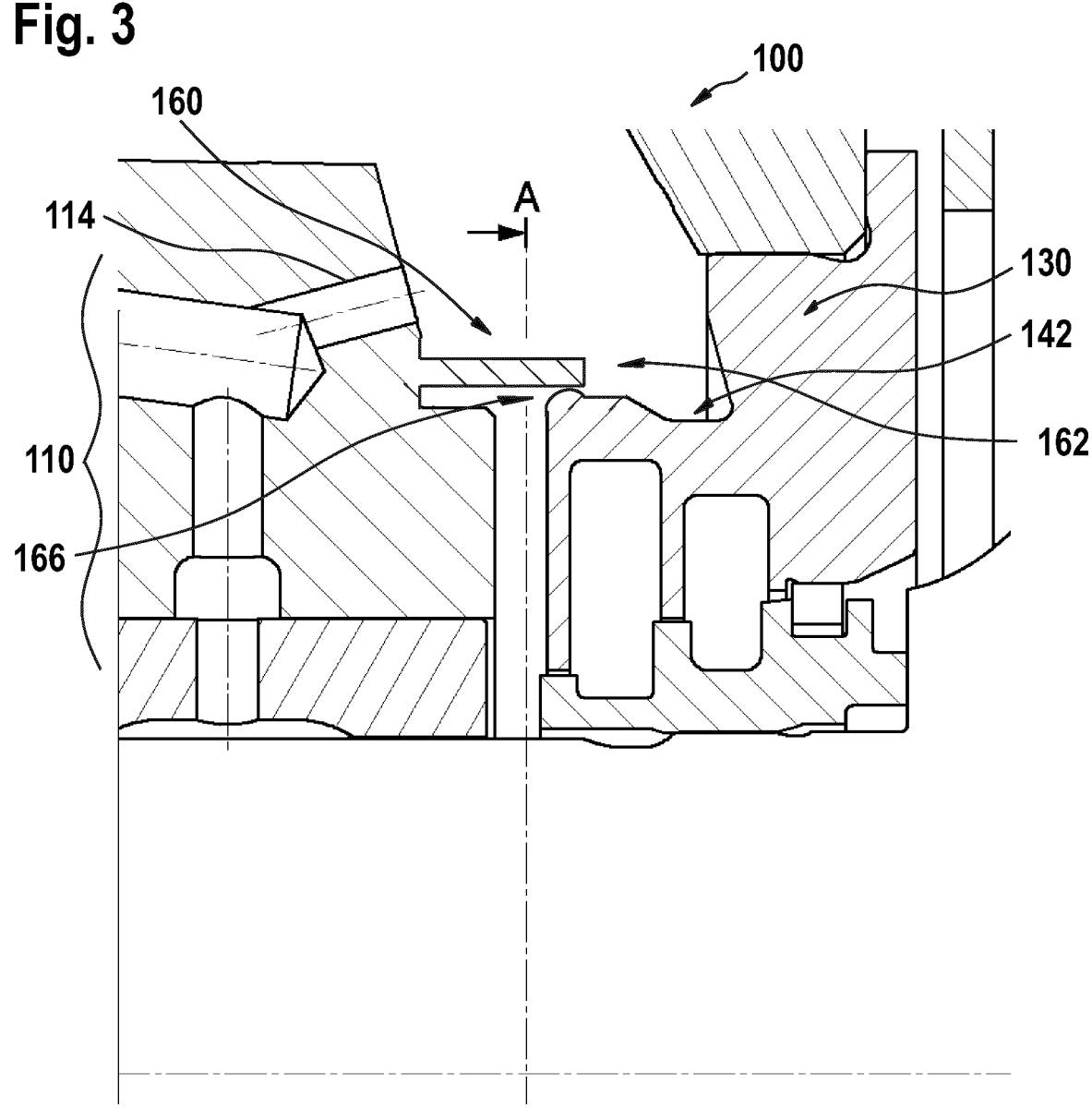
FIG. 3 shows a cross-sectional side view of an exhaust turbine apparatus according to embodiments described herein.

FIG. 3 exemplarily shows a side view of an exhaust turbine apparatus 100 according to embodiments described herein. It is to be understood that only the part at a top region of the shaft is shown. In the embodiment of FIG. 3, the oil barrier wall 160 is shown integrally formed with the bearing member 110, e.g. with the bearing flange of the bearing member. Particularly, the oil barrier wall 160 may be arranged radially below the oil channel 114. The oil barrier wall may extend towards the sealing bush portion 130. Particularly, the oil barrier wall may overlap with the sealing bush portion to prevent (cooling) oil from reaching the oil drainage chamber. In this embodiment and as exemplarily shown in FIG. 3, the second scaling device 166 may e.g. be a protrusion from the scaling bush portion 130. It may be understood that additionally or alternatively, the second sealing device 166 may also be selected from the second sealing devices as described herein. For example, a scaling gap may be provided between the protrusion and the oil barrier wall. The cooling oil from the oil cooling chamber may be provided to the oil recess 142 and may be guided to the oil drainage opening via the drainage channel as described herein.

Figure 4:
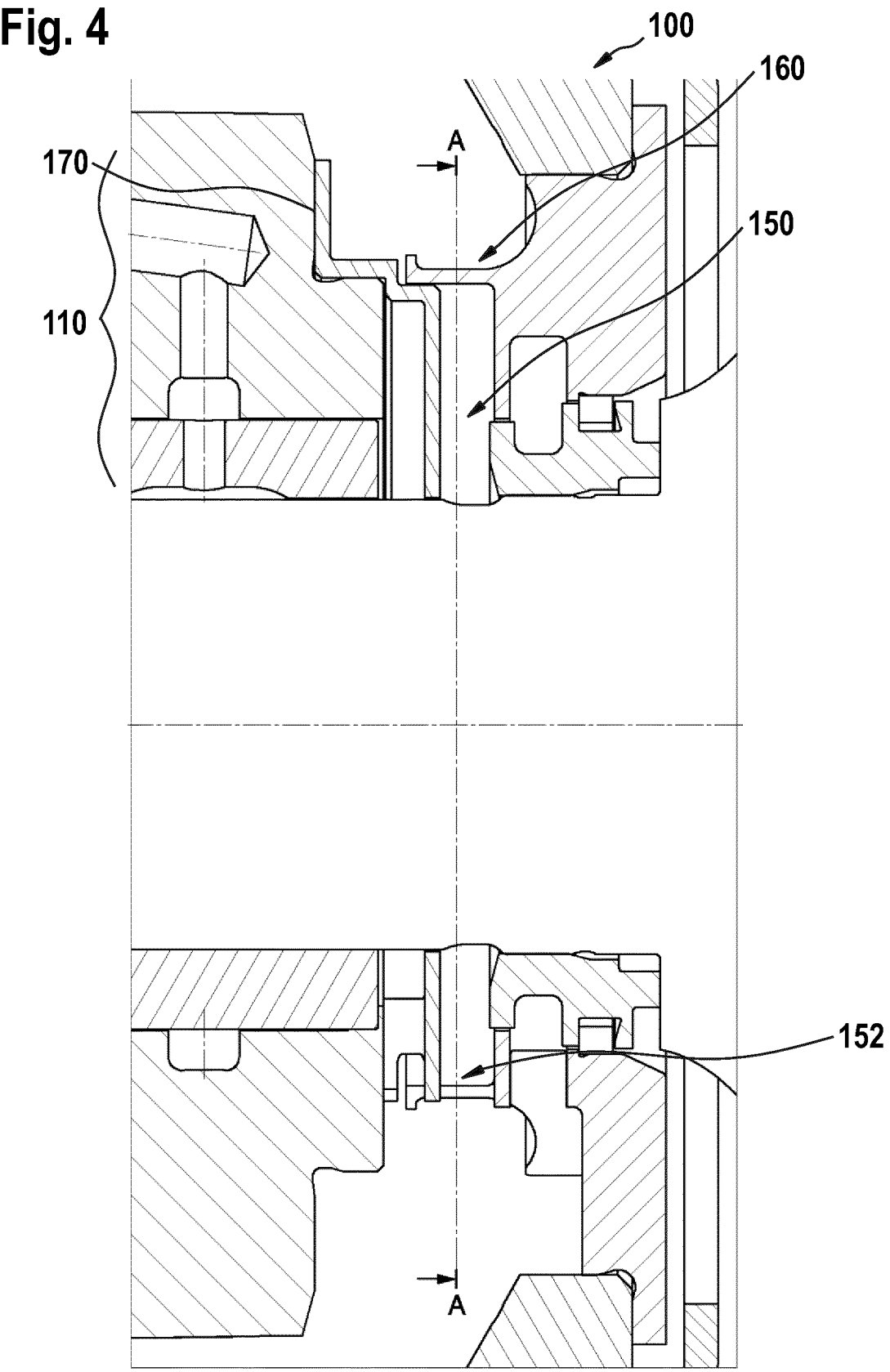
FIG. 4 shows a cross-sectional side view of an exhaust turbine apparatus according to embodiments described herein.

According to embodiments, that can be combined with any other embodiment described herein and as exemplarily shown in FIG. 4, the bearing member may include an oil deflection plate 170 at the turbine-facing side wall of the bearing member. The oil barrier wall may axially overlap with the oil deflection plate 170 or may be flush with the oil deflection plate. According to embodiments, the oil deflection plate may be an oil baffle plate. The oil deflection plate 170 may radially extend to the oil drainage 152. The oil deflection plate may be configured to provide a pre-drain chamber. The pre-drain chamber may be a chamber formed by the turbine-facing wall of the bearing member 110 and the oil deflection plate. Particularly, the pre-drain chamber may prevent lubricating oil from entering the oil drainage chamber 150. Further, the oil deflection plate may shield the bearing member 110 from cooling oil. Further, the oil deflection plate may be configured to prevent (lubricating) oil from the bearing to enter the oil drainage chamber.

Figure 5A:
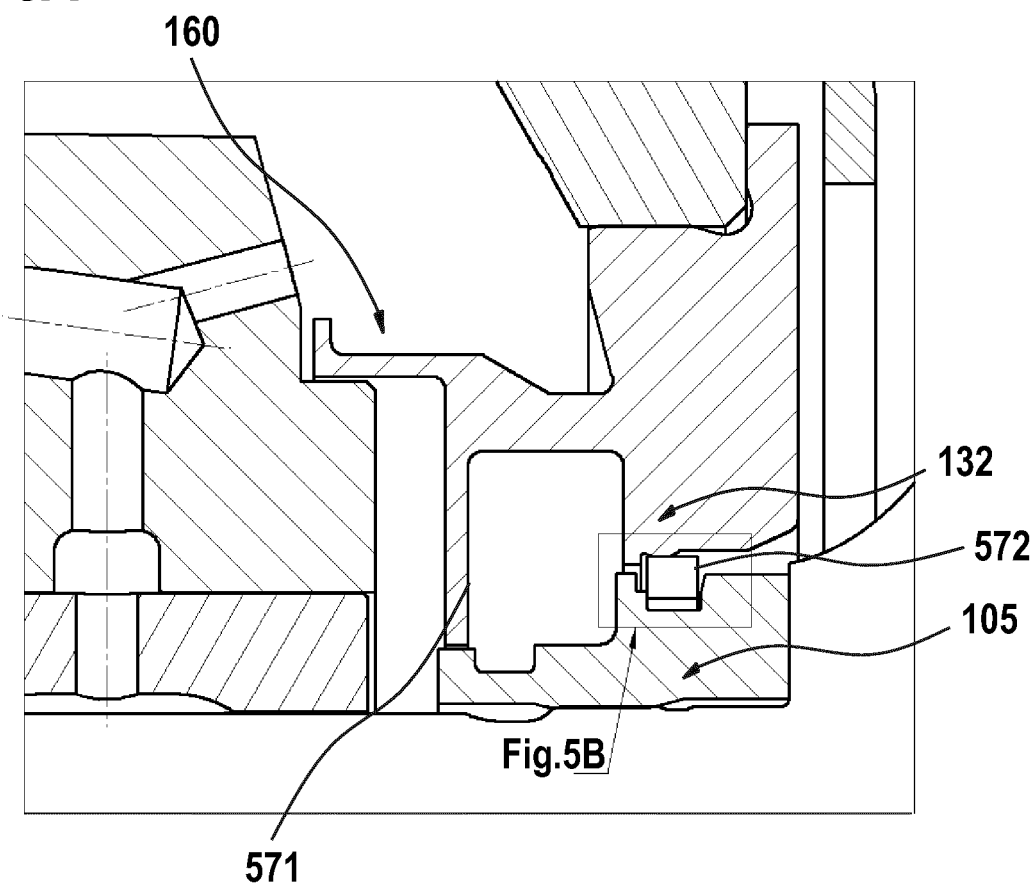
FIGS. 5A and 5B show a cross-sectional side view and a magnified view of an exhaust turbine apparatus according to embodiments described herein.
Figure 5B:
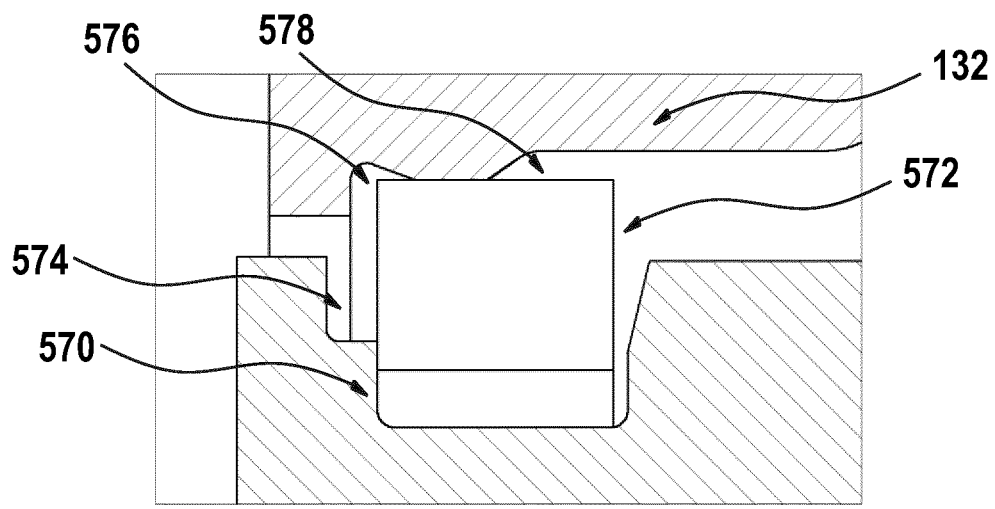

According to embodiments, that can be combined with any other embodiment described herein and as exemplarily shown in FIGS. 5A and 5B (which is a magnified view of FIG. 5A), the first scaling device 132 may include or consist of an oil catch chamber 571 and a piston ring 572. Particularly, the first sealing device may include (only) one piston ring 572. As exemplarily depicted in the magnified view of FIG. 5B, the piston ring may be provided between the scaling bush portion 132 and the shaft 105. Particularly, the piston ring 572 may be provided in the cavity 570 of the shaft. The cavity may include a bearing-sided first wall including a recess 574. At an axially opposing side, the cavity may include a second wall that may be tapered towards the turbine side. Radially outwardly of the bearing-sided recess, a depression may be provided at the sealing bush portion. The piston ring may be provided at the depression of the sealing bush portion. In operation, the piston ring may be pressed against a side wall of the cavity 570 (e.g., against a shaft wall such as the first wall of the cavity in the shaft). At a turbine-facing side of the piston ring, a notch 578 may be provided at the sealing bush portion to allow for a higher pressure to be provided to the piston ring, thereby enhancing its scaling capacity. Additionally or alternatively, the notch may facilitate axial movement of the piston ring by reducing radial forces, such that axial pressing of the piston ring against a cavity side wall (the bearing-sided first wall) may be facilitated and the sealing capacity of the piston ring is enhanced.

In other respects, the description of FIGS. 1 and 2 also applies to FIGS. 3 4, 5A and 5B, respectively.

Embodiments described herein may beneficially provide an oil-cooled exhaust turbine apparatus with increased or improved oil tightness behavior and reduced oil load at the transition between the shaft and the turbine sided gas passage.

While the foregoing is directed to embodiments of the disclosure, other and further embodiments of the disclosure may be devised without departing from the basic scope thereof, and the scope thereof is determined by the claims that follow.

The invention claimed is:

1. An oil-cooled exhaust turbine apparatus, the exhaust turbine apparatus comprising:
   a rotatable shaft with a turbine wheel;
   a bearing member comprising a bearing for rotatably supporting the shaft;
   a bearing housing accommodating the bearing member therein and comprising a sealing bush portion extending radially inwardly towards the shaft at an axial position between the turbine wheel and the bearing member for providing a first sealing device axially between the turbine wheel and the bearing member; and
   an oil cooling chamber for cooling an inner face of the bearing housing; wherein
   the exhaust turbine apparatus comprises an oil channel for providing oil into the oil cooling chamber for cooling the inner wall of the bearing housing using the oil as cooling medium; and
   an oil drainage chamber arranged axially between the bearing member and the sealing bush portion; and wherein the exhaust turbine apparatus further comprises an oil barrier wall surrounding, in at least a vertically top circumferential segment, a radially outer side of the oil drainage chamber for covering the oil drainage chamber from the oil cooling chamber;
wherein the oil barrier wall is formed integrally with one of the sealing bush portion and the bearing member; and
wherein the oil barrier wall further comprises a wall tip section axially overlapping with the other one of the sealing bush portion and the bearing member, wherein the wall tip section integrally formed with the sealing bush portion axially overlaps only a portion of the bearing member.

2. The oil-cooled exhaust turbine apparatus according to claim 1, wherein the oil drainage chamber extends radially outwardly from the shaft and/or from a bearing bush of the bearing member.

3. The oil-cooled exhaust turbine apparatus according claim 1, wherein the oil barrier wall comprises an axial wall section extending axially from a wall base at the one of the sealing bush portion and the bearing member.

4. The oil-cooled exhaust turbine apparatus according to claim 1, wherein the oil barrier wall further comprises a radial wall section extending radially outwardly from the wall portion.

5. The oil-cooled exhaust turbine apparatus according to claim 1, wherein the oil drainage chamber is at least formed by a turbine-facing side wall of the bearing member and a bearing-member-facing side wall of the sealing bush portion and optionally by the shaft.

6. The oil-cooled exhaust turbine apparatus according to claim 1, wherein the oil cooling chamber is axially delimited by the bearing housing and the bearing member and wherein the sealing bush portion delimits the oil cooling chamber at least partially from radially inwards and axially from the turbine wheel.

7. The oil-cooled exhaust turbine apparatus according to claim 1, wherein the oil drainage chamber has an oil drainage opening at a vertically bottom side of the oil drainage chamber.

8. The oil-cooled exhaust turbine apparatus according to claim 1, wherein the oil cooling chamber comprises an oil recess for receiving oil from the oil cooling chamber and wherein the oil recess forms a drainage channel, the drainage channel extending at least partially circumferentially for guiding the cooling oil downwards along the oil drainage channel around the rotatable shaft.

9. The oil-cooled exhaust turbine apparatus according to claim 1, wherein an oil drainage is arranged vertically below the shaft and wherein the oil drainage channel is configured to guide oil received from the oil cooling chamber and/or the oil barrier wall to the oil drainage.

10. The oil-cooled exhaust turbine apparatus according to claim 1, wherein the first sealing device comprises a sealing element and wherein the shaft comprises a cavity for supporting the sealing element.

11. The oil-cooled exhaust turbine apparatus according to claim 1, wherein a second sealing device is provided between the oil barrier wall and the bearing member and/or between the oil barrier wall and the sealing bush portion.

12. The oil-cooled exhaust turbine apparatus according to claim 1, wherein the oil barrier wall is arranged radially inwardly of the oil channel.

13. The oil-cooled exhaust turbine apparatus according to claim 11, wherein the second sealing device is selected from the group consisting of a sealing gap, a sealing ring, a labyrinth seal, a contact seal, seal air and/or combinations thereof.

14. The oil-cooled exhaust turbine apparatus according to claim 1, wherein the bearing member comprises an oil deflection plate at the turbine-facing side wall of the bearing member and wherein the oil barrier wall axially overlaps with the oil deflection plate.

15. The oil-cooled exhaust turbine apparatus according to claim 1, wherein the oil-cooled exhaust turbine apparatus is a turbocharger or a power turbine.

16. The oil-cooled exhaust turbine apparatus according to claim 1, wherein the sealing bush portion is comprised of the turbine-facing side wall of the bearing housing.

17. The oil-cooled exhaust turbine apparatus according to claim 1, wherein the sealing bush portion is comprised of a separate component of the bearing housing.

18. An oil-cooled exhaust turbine apparatus, the exhaust turbine apparatus comprising:
a rotatable shaft with a turbine wheel;
a bearing member comprising a bearing for rotatably supporting the shaft;
a bearing housing accommodating the bearing member therein and comprising a sealing bush portion extending radially inwardly towards the shaft at an axial position between the turbine wheel and the bearing member for providing a first sealing device axially between the turbine wheel and the bearing member; and
an oil cooling chamber for cooling an inner face of the bearing housing; wherein the exhaust turbine apparatus comprises an oil channel for providing oil into the oil cooling chamber for cooling the inner wall of the bearing housing using the oil as cooling medium; and
an oil drainage chamber arranged axially between the bearing member and the sealing bush portion; and wherein
the exhaust turbine apparatus further comprises an oil barrier wall surrounding, in at least a vertically top circumferential segment, a radially outer side of the oil drainage chamber for covering the oil drainage chamber from the oil cooling chamber;
wherein the oil barrier wall is formed integrally with one of the sealing bush portion and the bearing member;
wherein the oil barrier wall further comprises a wall tip section axially overlapping with the other one of the sealing bush portion and the bearing member; and
wherein the bearing member comprises an oil deflection plate at a turbine-facing side wall of the bearing member and wherein the oil barrier wall axially overlaps with the oil deflection plate.

19. An oil-cooled exhaust turbine apparatus, the exhaust turbine apparatus comprising:
a rotatable shaft with a turbine wheel;
a bearing member comprising a bearing for rotatably supporting the shaft;
a bearing housing accommodating the bearing member therein and comprising a sealing bush portion extending radially inwardly towards the shaft at an axial position between the turbine wheel and the bearing member for providing a first sealing device axially between the turbine wheel and the bearing member, wherein the sealing bush portion is comprised of a separate component of the bearing housing; and
an oil cooling chamber for cooling an inner face of the bearing housing; wherein the exhaust turbine apparatus comprises an oil channel for providing oil into the oil cooling chamber for cooling the inner wall of the bearing housing using the oil as cooling medium; and an oil drainage chamber arranged axially between the bearing member and the sealing bush portion; and wherein the exhaust turbine apparatus further comprises an oil barrier wall surrounding, in at least a vertically top circumferential segment, a radially outer side of the oil drainage chamber for covering the oil drainage chamber from the oil cooling chamber;

wherein the oil barrier wall is formed integrally with one of the sealing bush portion and the bearing member; and wherein the oil barrier wall further comprises a wall tip section axially overlapping with the other one of the sealing bush portion and the bearing member.

* * * * *